(12) United States Patent
Xue et al.

(10) Patent No.: US 6,833,401 B1
(45) Date of Patent: Dec. 21, 2004

(54) METHOD FOR PRODUCING AN AQUEOUS DISPERSION OF PARTICLES THAT ARE MADE UP OF POLYMERS AND INORGANIC SOLID MATTER WHICH CONSISTS OF FINE PARTICLES

(75) Inventors: Zhijian Xue, Ludwigshafen (DE); Harm Wiese, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 227 days.

(21) Appl. No.: 10/088,518

(22) PCT Filed: Oct. 10, 2000

(86) PCT No.: PCT/EP00/09915
§ 371 (c)(1),
(2), (4) Date: Mar. 29, 2002

(87) PCT Pub. No.: WO01/29106
PCT Pub. Date: Apr. 26, 2001

(30) Foreign Application Priority Data

Oct. 20, 1999 (DE) .......................................... 199 50 464
Jan. 7, 2000 (DE) .......................................... 100 00 281

(51) Int. Cl.$^7$ ............................ C08J 3/00; C08K 3/00; C08K 3/22; C08L 33/00; A61B 5/00
(52) U.S. Cl. ..................... 524/401; 523/333; 524/2; 524/4; 524/5; 524/8; 524/497; 524/543; 524/555; 524/556; 600/300
(58) Field of Search ...................... 523/333; 524/401, 524/497, 2, 4, 556, 5, 555, 8, 543; 600/300

(56) References Cited

U.S. PATENT DOCUMENTS

| | | | |
|---|---|---|---|
| 3,544,500 A | 12/1970 | Osmond et al. | |
| 4,421,660 A | 12/1983 | Solc | |
| 4,608,401 A | 8/1986 | Martin | |
| 4,609,608 A | 9/1986 | Solc | |
| 4,981,882 A | 1/1991 | Smith et al. | |
| 5,431,956 A | 7/1995 | Robb et al. | |
| 5,750,618 A | 5/1998 | Bross et al. | |
| 6,455,219 B1 | 9/2002 | Chen et al. | |

FOREIGN PATENT DOCUMENTS

| | | |
|---|---|---|
| DE | 199 42 777 | 3/2001 |
| EP | 0 104 498 | 9/1983 |
| EP | 0 505 230 | 3/1992 |
| EP | 0 572 128 | 5/1993 |
| EP | 0 572 128 | 12/1993 |
| EP | 0 606 930 | 7/1994 |
| GB | 2 227 739 | 8/1990 |
| GB | 2 250 020 | 5/1992 |
| JP | 11-209622 | 1/1998 |

OTHER PUBLICATIONS

Bernd–R. Paulke et al.: "Synthesis studies on paramagnetic polystyrene latex particles" Scientific and Clinical Application of Magnetic Carriers, pp. 69–76 1997.

Christelle Barthet et al.: "Synthesis of novel polymer–silica colloidal nanocomposites via free–radical polymerization of vinyl monomers" Advanced Materials, vol. 11, No.5, pp. 408–410.

Kunio Furusawa et al.: "Syntheses of composite polystyrene latices with silica particles in the core" Journal of Colloid and Interface Science, vol. 109, No. 1, pp. 69–76 01/86.

Wolf–Dieter Hergeth et al.: "Polymerization in the presence of seeds. Part IV: Emulsion polymers containing inorganic filler particles" Polymer, vol. 30, pp. 254–258 02/89.

Yutaka Haga et al.: "Encapsulating polymerization of titanium dioxide" Die Angewandte Makromolekulare Chemie, 189, pp. 23–34 1991.

Fu Long et al.: "Study on encapsulation of organic polymers in the presence of inorganic sol particles" Journal of Tianjin University, No. 4, pp. 10–15 Jul. 13, 1991.

E. Bourgeat–Lami et al.: "Emulsion polymerization in the presence of colloidal silica particles" Die Angewandte Makromolekulare Chemie, 242, pp. 105–122 1996.

*Primary Examiner*—Patrick D. Niland
(74) *Attorney, Agent, or Firm*—Oblon, Spivak, McClelland, Maier & Neustadt, P.C.

(57) ABSTRACT

A process for preparing an aqueous dispersion of particles composed of addition polymer and finely divided inorganic solid (composite particles), in which process a mixture of ethylenically unsaturated monomers is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant.

21 Claims, No Drawings

METHOD FOR PRODUCING AN AQUEOUS DISPERSION OF PARTICLES THAT ARE MADE UP OF POLYMERS AND INORGANIC SOLID MATTER WHICH CONSISTS OF FINE PARTICLES

BACKGROUND OF THE INVENTION

Field of the Invention

The present invention relates to a process for preparing an aqueous dispersion of particles composed of addition polymer and finely divided inorganic solid (composite particles), in which process a mixture of ethylenically unsaturated monomers is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant. The present invention further relates to the use of the aqueous composite-particle dispersion and of the composite-particle powders.

Aqueous dispersions of composite particles are general knowledge. They are fluid systems whose disperse phase in the aqueous dispersion medium comprises polymer coils consisting of a plurality of intertwined polymer chains—known as the polymer matrix—and particles composed of finely divided inorganic solid, which are in disperse distribution. The diameter of the composite particles is frequently within the range from 50 to 5,000 nm.

Like polymer solutions when the solvent is evaporated and aqueous polymer dispersions when the aqueous dispersion medium is evaporated, aqueous dispersions of composite particles have the potential to form modified polymer films containing finely divided inorganic solid, and on account of this potential they are of particular interest as modified binders—for example, for paints or for compositions for coating leather, paper or plastics films. The composite-particle powders obtainable in principle from aqueous dispersions of composite particles are, furthermore, of interest as additives for plastics, as components for toner formulations, or as additives in electrophotographic applications.

The preparation of aqueous dispersions of composite particles is based on the following prior art.

A process for preparing polymer-enveloped inorganic particles by means of aqueous emulsion polymerization is disclosed in U.S. Pat. No. 3,544,500. In this process the inorganic particles are coated with water-insoluble polymers before the actual aqueous emulsion polymerization. The inorganic particles thus treated in a laborious process are dispersed in an aqueous medium using special stabilizers.

EP-A 104 498 relates to a process for preparing polymer-enveloped solids. A characteristic of the process is that finely divided solids having a minimal surface charge are dispersed in the aqueous polymerization medium by means of a nonionic protective colloid and the ethylenically unsaturated monomers added are polymerized by means of nonionic polymerization initiators.

U.S. Pat. No. 4,421,660 discloses a process for preparing aqueous dispersions whose disperse particles feature inorganic particles surrounded completely by a polymer shell. The aqueous dispersions are prepared by free-radically initiated aqueous emulsion polymerization of hydrophobic ethylenically unsaturated monomers in the presence of inorganic particles in disperse distribution.

DESCRIPTION OF THE BACKGROUND

A process for polymerizing ethylenically unsaturated monomers in the presence of uncharged inorganic solid particles stabilized in the aqueous reaction medium using nonionic dispersants is disclosed in U.S. Pat. No. 4,608,401.

The free-radically initiated aqueous emulsion polymerization of styrene in the presence of modified silicon dioxide particles is described by Furusawa et al. in Journal of Colloid and Interface Science 109 (1986) 69 to 76. The spherical silicon dioxide particles, having an average diameter of 190 nm, are modified using hydroxypropylcellulose.

Hergeth et al. (see Polymer 30 (1989) 254 to 258) describe the free-radically initiated aqueous emulsion polymerization of methyl methacrylate and, respectively, vinyl acetate in the presence of aggregated, finely divided quartz powder. The particle sizes of the aggregated quartz powder used are between 1 and 35 $\mu$m.

GB-A 2 227 739 relates to a special emulsion polymerization process in which ethylenically unsaturated monomers are polymerized using ultrasound waves in the presence of dispersed inorganic powders which have cationic charges. The cationic charges of the dispersed solid particles are generated by treating the particles with cationic agents, preference being give to aluminum salts. The document, however, gives no details of particle sizes and stability of the aqueous dispersions of solids.

EP-A 505 230 discloses the free-radical aqueous emulsion polymerization of ethylenically unsaturated monomers in the presence of surface-modified silicon dioxide particles. They are functionalized using special acrylic esters containing silanol groups.

U.S. Pat. No. 4,981,882 relates to the preparation of composite particles by means of a special emulsion polymerization process. Essential features of the process are finely divided inorganic particles dispersed in the aqueous medium by means of basic dispersants; the treatment of these inorganic particles with ethylenically unsaturated carboxylic acids; and the addition of at least one amphiphilic component for the purpose of stabilizing the dispersion of solids during the emulsion polymerization. The finely divided inorganic particles preferably have a size of between 100 and 700 nm.

Haga et al. (cf. Angewandte Makromolekulare Chemie 189 (1991) 23 to 34) describe the influence of the nature and concentration of the monomers, the nature and concentration of the polymerization initiator, and the pH on the formation of polymers on particles of titanium dioxide dispersed in an aqueous medium. High encapsulation yields of the titanium dioxide particles are obtained if the polymer chains and the titanium dioxide particles have opposing charges. However, the publication contains no information on the particle size and the stability of the titanium dioxide dispersions.

In Tianjin Daxue Xuebao 4 (1991) pages 10 to 15, Long et al. describe the dispersant-free polymerization of methyl methacrylate in the presence of finely divided particles of silicon dioxide and, respectively, aluminum. High encapsulation yields of the inorganic particles are obtained if the end groups of the polymer chains and the inorganic particles have opposing charges.

EP-A 572 128 relates to a preparation process for composite particles in which the inorganic particles are treated with an organic polyacid or a salt thereof at a defined pH in an aqueous medium, and the subsequent free-radically initiated aqueous emulsion polymerization of ethylenically unsaturated monomers takes place at a pH<9.

Bourgeat-Lami et al. (cf. Angewandte Makromolekulare Chemie 242 (1996) 105 to 122) describe the reaction products obtainable by free-radical aqueous emulsion polymerization of ethyl acrylate in the presence of functionalized and unfunctionalized silicon dioxide particles. The polymerization experiments were generally carried out using anionically charged silicon dioxide particles, the nonionic nonylphenol ethoxylate NP30 and the anionic sodium dodecyl sulfate (SDS) as emulsifiers and potassium peroxodisulfate as free-radical polymerization initiator. The authors describe the resulting reaction products as aggregates containing more than one silicon dioxide particle or as polymer clusters which form on the silicon dioxide surface.

Paulke et al. (cf. Synthesis Studies of Paramagnetic Polystyrene Latex Particles in Scientific and Clinical Applications of Magnetic Carriers, pages 69 to 76, Plenum Press, New York, 1997) describe three fundamental synthesis routes for preparing aqueous polymer dispersions containing iron oxide. Because of the deficient stability of the aqueous dispersion of solids, the use of freshly precipitated iron(II/III) oxide hydrate is an unavoidable precondition for all of the synthesis routes. In the first synthesis route, in the presence of this freshly precipitated iron(II/III) oxide hydrate, the free-radically initiated aqueous emulsion polymerization of styrene takes place with SDS as emulsifier and potassium peroxodisulfate as polymerization initiator. In the authors' favored second synthesis route, styrene and methacrylic acid are polymerized in the presence of the freshly precipitated iron(II/III) oxide hydrate, the emulsifier N-cetyl-N,N,N-trimethylammonium bromide (CTAB), and special surface-active polymerization initiators (PEGA 600) in methanolic/aqueous medium. The third synthesis route uses ethanol and methoxyethanol as polymerization medium, hydroxypropylcellulose as emulsifier, benzoyl peroxide as polymerization initiator, and a special iron(II/III) oxide/styrene mixture in order to prepare polymer dispersions containing iron oxide.

Japanese laid-open specification JP 11-209622 discloses a process for preparing core/shell particles having a silica particle core and a polymer shell. The core/shell particles are prepared by subjecting the silica particles, which are in colloidal form in an aqueous medium, to pretreatment with a cationic vinyl monomer or radical initiator, followed by radically initiated aqueous emulsion polymerization with ethylenically unsaturated monomers.

Armes et al. (cf. Advanced Materials 11 (5) (1999) 408 to 410) describe the preparation of silicon dioxide composite particles which are obtainable in an emulsifier-free, free-radically initiated aqueous emulsion polymerization at a pH of 10 with special olefinically unsaturated monomers in the presence of dispersed silicon dioxide particles. Postulated as a precondition for the formation of polymer particles containing silicon dioxide is a strong acid/base interaction between the polymer formed and the acidic silicon dioxide particles used. Polymer particles containing silicon dioxide were obtained with poly-4-vinylpyridine and copolymers of styrene and, respectively, methyl methacrylate with 4-vinylpyridine. From 4 to 10 mol % is mentioned as the lowest possible content of 4-vinylpyridine in methyl methacrylate or styrene monomer mixtures capable of forming composite particles containing silicon dioxide.

The German patent application bearing the file reference 19942777.1, unpublished at the priority date of the present specification, describes a process for preparing aqueous composite-particle dispersions wherein the dispersed inorganic solid particles and the radical-generating and/or dispersive components used in the free-radically initiated aqueous emulsion polymerization have opposite charges.

SUMMARY OF THE INVENTION

It is an object of the present invention to provide an improved process for preparing an aqueous dispersion of composite particles by the method of free-radically initiated aqueous emulsion polymerization which is unhampered or less hampered by the disadvantages of the known processes and provides composite particles having a balanced profile of good performance properties.

We have found that this object is achieved by a process for preparing an aqueous dispersion of composite particles composed of addition polymer and finely divided inorganic solid, in which process a mixture of ethylenically unsaturated monomers is dispersely distributed in aqueous medium and is polymerized by the method of free-radical aqueous emulsion polymerization by means of at least one free-radical polymerization initiator in the presence of at least one dispersely distributed, finely divided inorganic solid and at least one dispersant, wherein a) a stable aqueous dispersion of said at least one inorganic solid is used, said dispersion having the characteristic features that at an initial solids concentration of $\geq 1\%$ by weight, based on the aqueous dispersion of said at least one solid, it still contains in dispersed form one hour after its preparation more than 90% by weight of the originally dispersed solid and its dispersed solid particles have a weight-average diameter $\leq 100$ nm, b) the dispersed particles of said at least one inorganic solid exhibit a nonzero electrophoretic mobility in an aqueous standard potassium chloride solution at a pH which corresponds to the pH of the aqueous reaction medium at the beginning of the emulsion polymerization, and c) the mixture of ethylenically unsaturated monomers contains >0 and $\leq 4\%$ by weight, based on its overall amount, of at least one ethylenically unsaturated monomer A, which comprises either at least one acid group and/or its corresponding anion, if the dispersed particles of said at least one inorganic solid have an electrophoretic mobility with a positive sign under the abovementioned conditions, or at least one amino, amido, ureido or N-heterocyclic group and/or its ammonium derivatives alkylated or protonated on the nitrogen, if the dispersed particles of said at least one inorganic solid have an electrophoretic mobility with a negative sign under the abovementioned conditions.

DETAILED DESCRIPTION OF THE PREFERRED EMBODIMENTS

Finely divided inorganic solids suitable for the process of the invention are all those which form stable aqueous dispersions which at an initial solids concentration of $\geq 1\%$ by weight, based on the aqueous dispersion of said at least one solid, still contain in dispersed form one hour after their preparation more than 90% by weight of the originally dispersed solid and whose dispersed solid particles have a weight-average diameter $\leq 100$ nm and which, furthermore, exhibit a nonzero electrophoretic mobility at a pH which corresponds to the pH of the aqueous reaction medium at the beginning of the emulsion polymerization.

The quantitative determination of the initial solids concentration and the solids concentration after one hour, and also the determination of the weight-average particle diameters, may be made, for example, by the method of the analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

Suitable finely divided inorganic solids which can be used in accordance with the invention include metals, metal compounds, such as metal oxides and metal salts, and also semimetal compounds and nonmetal compounds. Finely divided metal powders which can be used are noble metal colloids, such as palladium, silver, ruthenium, platinum, gold and rhodium, for example, and their alloys. Examples that may be mentioned of finely divided metal oxides include titanium dioxide (commercially available, for example, as Hombitec® grades from Sachtleben Chemie GmbH), zirconium(IV) oxide, tin(II) oxide, tin(IV) oxide (commercially available, for example, as Nyacol® SN grades from Akzo-Nobel), aluminum oxide (commercially available, for example, as Nyacol® AL grades from Akzo-Nobel), barium oxide, magnesium oxide, various iron oxides, such as iron(II) oxide (wustite), iron(III) oxide (hematite) and iron(II/III) oxide (magnetite), chromium(III) oxide, antimony(III) oxide, bismuth(III) oxide, zinc oxide (commercially available, for example, as Sachtotec® grades from Sachtleben Chemie GmbH), nickel(II) oxide, nickel (III) oxide, cobalt(II) oxide, cobalt(III) oxide, copper(II) oxide, yttrium(III) oxide (commercially available, for example, as Nyacol® YTTRIA grades from Akzo-Nobel), cerium(IV) oxide (commercially available, for example, as Nyacol® CEO2 grades from Akzo-Nobel), amorphous and/or in their different crystal modifications, and also their hydroxy oxides, such as, for example, hydroxytitanium(IV) oxide, hydroxyzirconium(IV) oxide, hydroxyaluminum oxide (commercially available, for example, as Disperal® grades from Condea-Chemie GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium (III) sulfide, titanium(IV) sulfide, zirconium(IV) sulfide, antimony(III) sulfide, and bismuth(III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin(III) orthophosphate, iron(II) orthophosphate, and iron(III) orthophosphate, metaphosphates, such as lithium metaphosphate, calcium metaphosphate, and aluminum metaphosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxyapatite [$Ca_5\{(PO_4)_3OH\}$], orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate, and zirconium(IV) orthosilicate, metasilicates, such as lithium metasilicate, calcium/magnesium metasilicate, calcium metasilicate, magnesium metasilicate, and zinc metasilicate, sheet silicates, such as sodium aluminum silicate and sodium magnesium silicate, especially in spontaneously delaminating form, such as, for example, Optigel®SH (trademark of Südchemie AG), Saponit® SKS-20 and Hektorit® SKS 21 (trademarks of Hoechst AG), and Laponite® RD and Laponite® GS (trademarks of Laporte Industries Ltd.), aluminates, such as lithium aluminate, calcium aluminate, and zinc aluminate, borates, such as magnesium metaborate and magnesium orthoborate, oxalates, such as calcium oxalate, zirconium(IV) oxalate, magnesium oxalate, zinc oxalate, and aluminum oxalate, tartrates, such as calcium tartrate, acetylacetonates, such as aluminum acetylacetonate and iron(III) acetylacetonate, salicylates, such as aluminum salicylate, citrates, such as calcium citrate, iron(II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(ii) oleate, and zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as Aerosil® (trademark of Degussa AG), Levasil® (trademark of Bayer AG), Ludox® (trademark of DuPont), Nyacol® and Bindzil® (trademarks of Akzo-Nobel) and Snowtex® (trademark of Nissan Chemical Industries, Ltd.). Nonmetal compounds suitable in accordance with the invention are, for example, colloidal graphite and diamond.

As said at least one finely divided inorganic solid it is furthermore possible to use all compounds mentioned above whose surfaces have been modified with polymeric compounds or inorganic materials.

Particularly suitable finely divided inorganic solids are those whose solubility in water at 20° C. and 1 bar (absolute) is $\leq 1$ g/l, preferably $\leq 0.1$ g/l and, in particular, $\leq 0.01$ g/l. Particular preference is given to compounds selected from the group consisting of silicon dioxide, aluminum oxide, tin(IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, iron(II) oxide, iron(III) oxide, iron(II/III) oxide, titanium dioxide, hydroxyapatite, zinc oxide, and zinc sulfide. Particular preference is given to silicon dioxide, aluminum oxide, hydroxyaluminum oxide, calcium carbonate, magnesium carbonate, calcium orthophosphate, hydroxyapatite and titanium dioxide.

In the process of the invention it is also possible to use with advantage the commercially available compounds of the Aerosil®, Levasil®, Ludox®, Nyacol® and Bindzil® grades (silicon dioxide), Disperal® registered grades (hydroxyaluminum oxide), Nyacol® AL grades (aluminum oxide), Hombitec® grades (titanium dioxide), Nyacol®SN grades (tin(IV) oxide), Nyacol® YTTRIA grades (yttrium (III) oxide), Nyacol® CEO2 grades (cerium(IV) oxide) and Sachtotec® grades (zinc oxide).

The finely divided inorganic solids which can be used in the process of the invention have particles which, dispersed in the aqueous reaction medium, have a weight-average particle diameter of $\leq 100$ nm. Finely divided inorganic solids used successfully are those whose dispersed particles have a weight-average diameter >0 nm but $\leq 90$ nm, $\leq 80$ nm, $\leq 70$ nm, $\leq 60$ nm, $\leq 50$ nm, $\leq 40$ nm, $\leq 30$ nm, $\leq 20$ nm or $\leq 10$ nm and all values in between. The weight-average particle diameters can be determined, for example, by the method of analytical ultracentrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. M ächtle, pages 147 to 175).

The obtainability of finely divided solids is known in principle to the skilled worker and they are obtained, for example, by precipitation reactions or chemical reactions in the gas phase (cf. E. Matijevic, Chem. Mater. 5 (1993) 412 to 426; Ullmann's Encyclopedia of Industrial Chemistry, Vol. A 23, pages 583 to 660, Verlag Chemie, Weinheim, 1992; D. F. Evans, H. Wennerström in The Colloidal Domain, pages 363 to 405, Verlag Chemie, Weinheim, 1994, and R. J. Hunter in Foundations of Colloid Science, Vol. I, pages 10 to 17, Clarendon Press, Oxford, 1991).

The stable dispersion of solids is prepared by dispersing the finely divided inorganic solid into the aqueous medium. Depending on the way in which the finely divided inorganic solids are prepared, this is done either directly, in the case, for example, of precipitated or pyrogenic silicon dioxide, aluminum oxide, etc., or by adding appropriate auxiliaries, such as dispersants, for example.

For the purposes of the present process, dispersants used according to the invention are those which maintain not only the finely divided inorganic solid particles but also the monomer droplets and the resulting composite particles in disperse distribution in the aqueous phase and so ensure the stability of the aqueous dispersion of composite particles that is produced. Suitable dispersants include both the protective colloids commonly used to carry out free-radical aqueous emulsion polymerizations, and emulsifiers.

Examples of suitable protective colloids are polyvinyl alcohols, polyalkylene glycols, alkali metal salts of polyacrylic acids and polymethacrylic acids, cellulose derivatives, starch derivatives and gelatin derivatives, or copolymers containing acrylic acid, methacrylic acid, maleic anhydride, 2-acrylamido-2-methylpropane-sulfonic acid and/or 4-styrenesulfonic acid, and the alkali metal salts of these copolymers, and also homopolymers and copolymers containing N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides. An exhaustive description of further suitable protective colloids is given in Houben-Weyl, Methoden der organischen Chemie, Volume XIV/1, Makromolekulare Stoffe [Macromolecular substances], Georg-Thieme-Verlag, Stuttgart, 1961, pages 411 to 420.

If the dispersed inorganic solid particles have an electrophoretic mobility with a negative sign, neutral protective colloids such as, for example, polyvinyl alcohols, polyalkylene glycols, cellulose, starch and gelatin derivatives and also anionic protective colloids, i.e., protective colloids whose dispersive component has at least one negative electrical charge, such as alkali metal salts of polyacrylic acids and polymethacrylic acids, copolymers containing acrylic acid, methacrylic acid, 2-acrylamido-2-methylpropanesulfonic acid, 4-styrenesulfonic acid and/or maleic anhydride, and the alkali metal salts of such copolymers, and also alkali metal salts of sulfonic acids of high molecular mass compounds such as, for example, polystyrene, are highly suitable in accordance with the invention. If the dispersed inorganic solid particles, on the other hand, have an electrophoretic mobility with a positive sign, neutral protective colloids such as, for example, the abovementioned polyvinyl alcohols, polyalkylene glycols, cellulose, starch and gelatin derivatives, but also cationic protective colloids, i.e., protective colloids whose dispersive component has at least one positive electrical charge, such as, for example, the N-protonated and/or N-alkylated derivatives of homopolymers and copolymers containing N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides are likewise highly suitable in accordance with the invention. In principle, in the case of dispersed solid particles having an electrophoretic mobility with a negative sign it is also possible to use mixtures of nondisrupting neutral and anionic protective colloids. Accordingly, in the case of solid particles having an electrophoretic mobility with a positive sign, it is also possible to use mixtures of nondisrupting neutral and cationic protective colloids.

It is of course also possible to use mixtures of emulsifiers and/or protective colloids. As dispersants it is common to use exclusively emulsifiers, whose relative molecular weights, unlike those of the protective colloids, are usually below 1,500. They can be anionic, cationic or nonionic in nature. Where mixtures of surface-active substances are used the individual components must of course be compatible with one another, which in case of doubt can be checked by means of a few preliminary experiments. In general, anionic emulsifiers are compatible with one another and with nonionic emulsifiers. The same applies to cationic emulsifiers as well, whereas anionic and cationic emulsifiers are usually incompatible with one another. An overview of suitable emulsifiers is given in Houben-Weyl, Methoden der organischen Chemie, Volume XIV/1, Makromolekulare Stoffe [Macromolecular substances], Georg-Thieme-Verlag, Stuttgart, 1961, pages 192 to 208.

Examples of customary nonionic emulsifiers are ethoxylated mono-, di- and tri-alkylphenols (EO units: 3 to 50, alkyl: $C_4$ to $C_{12}$) and ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: 3 to 8), Lutensol® AO grades ($C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol® ON grades ($C_{10}$ oxo alcohol ethoxylates, EO units: 3 to 11), and the Lutensol® TO grades ($C_{13}$ oxoalcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further anionic emulsifiers are, furthermore, compounds of the formula I

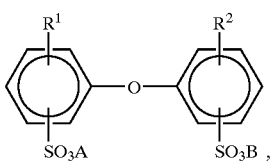

(I)

in which $R^1$ and $R^2$ are hydrogens or $C_4$ to $C_{24}$ alkyl but are not both simultaneously hydrogens and A and B can be alkali metal ions and/or ammonium ions. In the formula I, $R^1$ and $R^2$ are preferably linear or branched alkyl radicals of 6 to 18 carbons, especially 6, 12 and 16 carbons, or —H, $R^1$ and $R^2$ not both being hydrogens simultaneously. A and B are preferably sodium, potassium or ammonium, particular preference being given to sodium. Particularly advantageous compounds I are those in which A and B are sodium, $R^1$ is a branched alkyl radical of 12 carbons, and $R^2$ is a hydrogen or $R^1$. Frequently, use is made of technical-grade mixtures containing a fraction of from 50 to 90% by weight of the monoalkylated product such as, for example, Dowfax® 2A1 (trademark of Dow Chemical Company). The compounds I are widely known, from U.S. Pat. No. 4,269,749, for example, and are obtainable commercially.

Suitable cationic emulsifiers are generally $C_6$–$C_{18}$-alkyl- or -aralkyl- or heterocyclic radical-containing primary, secondary, tertiary or quaternary ammonium salts, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides or acetates of the various ethyl 2-(N,N,N-trimethylammonium) paraffinates, N-cetylpyridinium chloride, N-laurylpyridinium sulfate, and also N-cetyl-N,N,N-trimethylammonium bromide, N-dodecyl-N,N,N-trimethylammonium bromide, N-octyl-N,N,N-trimethylammonium bromide, N,N-distearyl-N,N-dimethylammonium chloride, and the gemini surfactant N,N'-(lauryldimethyl)ethylenediamine dibromide. Many further examples can be found in H. Stache, Tensid-Taschenbuch, Carl-Hanser-Verlag, Munich, Vienna, 1981, and in Mc Cutcheon's, Emulsifiers & Detergents, MC Publishing Company, Glen Rock, 1989.

Since nonionic emulsifiers can be used with dispersed solid particles having an electrophoretic mobility with a positive or negative sign, they are especially suitable in accordance with the invention. In the case of dispersed solid particles having an electrophoretic mobility with a positive sign, furthermore, it is also possible to use cationic emulsifiers or mixtures of nonionic and cationic emulsifiers which are not mutually disruptive. Correspondingly, for the dispersed solid particles having an electrophoretic mobility with a negative sign, anionic emulsifiers or mixtures of nonionic emulsifiers and anionic emulsifiers which are not mutually disruptive are suitable.

In general the amount of dispersant used is from 0.05 to 20% by weight, frequently from 0.1 to 5% by weight, often from 0.2 to 3% by weight, based in each case on the overall amount of said at least one finely divided inorganic solid and on said mixture of ethylenically unsaturated monomers used for the polymerization. All of the at least one dispersant used in the process can be introduced as an initial charge in the aqueous dispersion of solids. An alternative option is to include, if desired, only part of the at least one dispersant in the initial charge in the aqueous dispersion of solids and to add the total amount, or the remaining amount if appropriate, of said at least one dispersant continuously or discontinuously during the free-radical emulsion polymerization.

In accordance with the invention, however, suitable finely divided inorganic solids are only those whose aqueous dispersion, at an initial solids concentration of $\geq 1\%$ by weight, based on the aqueous dispersion of the finely divided inorganic solid, still contains in dispersed form one hour after its preparation more than 90% by weight of the originally dispersed solid and whose dispersed solid particles have a weight-average diameter $\leq 100$ mm. Initial solids concentrations $\geq 60\%$ by weight are customary. With advantage, however, it is also possible to use initial solids concentrations $\leq 55\%$ by weight, $\leq 50\%$ by weight, $\leq 45\%$ by weight, $\leq 40\%$ by weight, $\leq 35\%$ by weight, $\leq 30\%$ by weight, $\leq 25\%$ by weight, $\leq 20\%$ by weight, $\leq 15\%$ by weight, $\leq 10\%$ by weight and $\geq 2\%$ by weight, $\geq 3\%$ by weight, $\geq 4\%$ by weight or $\geq 5\%$ by weight and all values in between, based in each case on the aqueous dispersion of the finely divided inorganic solid.

An essential feature of the invention is that the dispersed solid particles exhibit a nonzero electrophoretic mobility in an aqueous standard potassium chloride solution at a pH which corresponds to the pH of the aqueous reaction medium at the beginning of the emulsion polymerization. For the purposes of this document, aqueous reaction medium at the beginning of the emulsion polymerization is the aqueous reaction medium present directly prior to adding said at least one free-radical polymerization initiator. The pH is measured at 20° C. and 1 bar (absolute) using customary commercial pH meters. Depending on the process being carried out, therefore, the pH is measured on an aqueous dispersion containing only the at least one finely divided inorganic solid or, in addition, the at least one dispersant and/or, in addition, the monomers used for the emulsion polymerization, and also any further auxiliaries.

The method of determining the electrophoretic mobility is known to the skilled worker (cf., e.g., R. J. Hunter, Introduction to Modern Colloid Science, Section 8.4, pages 241 to 248, Oxford University Press, Oxford, 1993, and K. Oka and K. Furusawa in Electrical Phenomena at Interfaces, Surfactant Science Series, Vol. 76, Chapter 8, pages 151 to 232, Marcel Dekker, New York, 1998). The electrophoretic mobility of the solid particles dispersed in the aqueous reaction medium is measured using a commercial electrophoresis instrument such as, for example, the Zetasizer 3000 from Malvern Instruments Ltd., at 20° C. and 1 bar (absolute). For this purpose the aqueous dispersion of solid particles is diluted with a pH-neutral 10 millimolar (mM) aqueous potassium chloride solution (standard potassium chloride solution) until the concentration of solid particles is from about 50 to 100 mg/l. The adjustment of the sample to the pH possessed by the aqueous reaction medium at the beginning of the emulsion polymerization is carried out using the customary inorganic acids, such as dilute hydrochloric acid or nitric acid, for example, or bases, such as dilute sodium hydroxide solution or potassium hydroxide solution, for example. The migration of the dispersed solid particles in the electrical field is detected by means of what is known as electrophoretic light scattering (cf., e.g., B. R. Ware and W. H. Flygare, Chem. Phys. Lett. 12 (1971) 81 to 85). In this method the sign of electrophoretic mobility is defined by the migrational direction of the dispersed solid particles; in other words, if the dispersed solid particles migrate to the cathode, their electrophoretic mobility is positive, while if they migrate to the anode, it is negative.

If surface-modified solid particles as described, for example, in the prior art are used, then the electrophoretic mobility is measured using these surface-modified particles. If, on the other hand, a finely divided inorganic solid can be dispersed only with the aid of dispersants, then the electrophoretic mobility must be measured using suitable nonionic dispersants, irrespective of whether cationic or anionic dispersants are actually used in the process of the invention. This is necessary because the ionic dispersants adsorb on the dispersed solid particles and so can alter or reverse their electrophoretic mobility.

A suitable parameter for influencing or adjusting the electrophoretic mobility of dispersed solid particles to a certain extent is the pH of the aqueous reaction medium. Protonation and, respectively, deprotonation of the dispersed solid particles alter the electrophoretic mobility positively in the acidic pH range (pH<7) and negatively in the alkaline range (pH>7). A pH range suitable for the process of the invention is that within which a free-radically initiated aqueous emulsion polymerization can be carried out. This pH range is generally from 1 to 12, frequently from 1.5 to 11, and often from 2 to 10.

The pH of the aqueous reaction medium may be adjusted by means of commercially customary acids, such as dilute hydrochloric acid, for example, or bases, such as dilute sodium hydroxide solution, for example. It is frequently favorable if a portion or the entirety of the amount of acid or base used for pH adjustment is added to the aqueous reaction medium before said at least one finely divided inorganic solid.

The conduct of a free-radically initiated aqueous emulsion polymerization of ethylenically unsaturated monomers is described in many instances in the prior art and is therefore sufficiently well known to the skilled worker [cf., e.g., Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, $2^{nd}$ Edition, Vol. 1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 24 (1990) pages 135 to 142, verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969 and the patent DE-A 40 03 422]. It is usually carried out by dispersely distributing said ethylenically unsaturated monomers in the aqueous medium, often with the use of dispersants, and polymerizing the monomers using at least one free-radical polymerization initiator. The process of the invention differs from this procedure only in the additional presence of at least one finely divided inorganic solid which has a nonzero electrophoretic mobility and also of at least one monomer A.

Monomers suitable as the ethylenically unsaturated monomers for the process of the invention include, in particular, nonionic monomers which are easy to polymerize free-radically, such as, for example, ethylene, vinylaromatic monomers, such as styrene, α-methylstyrene, o-chlorostyrene or vinyltoluenes, esters of vinyl alcohol and $C_1$–$C_{18}$ monocarboxylic acids, such as vinyl acetate, vinyl propionate, vinyl n-butyrate, vinyl laurate and vinyl stearate, esters of preferably $C_3$–$C_6$ α,β-monoethylenically unsaturated mono- and dicarboxylic acids, such as especially acrylic acid, methacrylic acid, maleic acid, fumaric acid and itaconic acid, with generally $C_1$–$C_{12}$, preferably $C_1$–$C_8$ and, in particular, $C_1$–$C_4$ alkanols, such as, in particular, methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and $C_{4-8}$ conjugated dienes, such as 1,3-butadiene and isoprene. These monomers generally constitute the principal monomers which, based on the overall amount of the monomers to be polymerized by the process of the invention, normally account for a proportion of more than 86% by weight. As a general rule, these monomers are only of moderate to poor solubility in water under standard conditions [20° C., 1 bar (absolute)].

Monomers which customarily increase the internal strength of the films of the polymer matrix normally have at least one epoxy, hydroxyl, N-methylol or carbonyl group or at least two nonconjugated ethylenically unsaturated double bonds. Examples are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are the methacrylic and acrylic $C_1$–$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the abovementioned monomers are frequently copolymerized in amounts of up to 10% by weight, based on the total amount of the monomers to be polymerized.

Monomers A used in accordance with the invention are ethylenically unsaturated monomers which contain either at least one acid group and/or its corresponding anion, or, respectively, at least one amino, amido, ureido or N-heterocyclic group and/or its ammonium derivatives alkylated or protonated on the nitrogen.

Where the dispersed particles of said at least one inorganic solid have an electrophoretic mobility with a positive sign, monomers A used comprise ethylenically unsaturated monomers having at least one acid group selected from the group consisting of the carboxylic acid, sulfonic acid, sulfuric acid, phosphoric acid and phosphonic acid groups. Examples thereof are acrylic acid, methacrylic acid, maleic acid, fumaric acid, itaconic acid, crotonic acid, 4-styrenesulfonic acid, 2-methacryloxyethyl-sulfonic acid, vinylsulfonic acid and vinylphosphonic acid and also phosphoric monoesters of n-hydroxyalkyl acrylates and n-hydroxyalkyl methacrylates, such as, for example, phosphoric monoesters of 2-hydroxyethyl acrylate, 3-hydroxypropyl acrylate, 4-hydroxybutyl acrylate and 2-hydroxyethyl methacrylate, 3-hydroxypropyl methacrylate or 4-hydroxybutyl methacrylate. In accordance with the invention, however, it is also possible to use the ammonium salts and alkali metal salts of the abovementioned ethylenically unsaturated monomers containing at least one acid group. Particularly preferred alkali metals are sodium and potassium. Examples thereof are the ammonium, sodium and potassium salts of acrylic acid, methacrylic acid, maleic acid, fumaric acid, itaconic acid, crotonic acid, 4-styrenesulfonic acid, 2-methacryloxyethylsulfonic acid, vinylsulfonic acid and vinylphosphonic acid and also the mono- and di-ammonium, -sodium and -potassium salts of the phosphoric monoesters of 2-hydroxyethyl acrylate, 3-hydroxypropyl acrylate, 4-hydroxybutyl acrylate and 2-hydroxyethyl methacrylate, 3-hydroxypropyl methacrylate or 4-hydroxybutyl methacrylate. It is also possible to use anhydrides of ethylenically unsaturated acids, such as, for example, maleic anhydride, and also ethylenically unsaturated monomers having at least one CH-acidic function, such as, for example, 2-(acetylacetoxy)ethyl methacrylate, as monomer A.

It is preferred to use acrylic acid, methacrylic acid, maleic acid, fumaric acid, itaconic acid, crotonic acid, 4-styrenesulfonic acid, 2-methacryloxyethylsulfonic acid, vinylsulfonic acid and vinylphosphonic acid.

Where, however, the dispersed inorganic particles of said at least one inorganic solid have an electrophoretic mobility with a negative sign, monomers A used are ethylenically unsaturated monomers containing at least one amino, amido, ureido or N-heterocyclic group and/or its ammonium derivatives alkylated or protonated on the nitrogen.

Examples of monomers A containing at least one amino group are 2-aminoethyl acrylate, 2-aminoethyl methacrylate, 3-aminopropyl acrylate, 3-aminopropyl methacrylate, 4-amino-n-butyl acrylate, 4-amino-n-butyl methacrylate, 2-(N-methylamino)ethyl acrylate, 2-(N-methylamino)ethyl methacrylate, 2-(N-ethylamino)ethyl acrylate, 2-(N-ethylamino)ethyl methacrylate, 2-(N-n-propylamino)ethyl acrylate, 2-(N-n-propylamino)ethyl methacrylate, 2-(N-iso-propylamino)ethyl acrylate, 2-(N-iso-propylamino)ethyl methacrylate, 2-(N-tert-butylamino) ethyl acrylate, 2-(N-tert-butylamino)ethyl methacrylate (commercially available, for example, as Norsocryl® TBAEMA from Elf Atochem), 2-(N,N-dimethylamino)ethyl acrylate, (commercially available, for example, as Norsocryl® ADAME from Elf Atochem), 2-(N,N-dimethylamino) ethyl methacrylate (commercially available, for example, as Norsocryl® MADAME from Elf Atochem), 2-(N,N-diethylamino)ethyl acrylate, 2-(N,N-diethylamino) ethyl methacrylate, 2-(N,N-di-n-propylamino)ethyl acrylate, 2-(N,N-di-n-propylamino) ethyl methacrylate, 2-(N,N-di-iso-propylamino)ethyl acrylate, 2-(N,N-di-iso-propylamino) ethyl methacrylate, 3-(N-methylamino)propyl acrylate, 3-(N-methylamino)propyl methacrylate, 3-(N-ethylamino) propyl acrylate, 3-(N-ethylamino)propyl methacrylate, 3-(N-n-propylamino)propyl acrylate, 3-(N-n-propylamino) propyl methacrylate, 3-(N-iso-propylamino)propyl acrylate, 3-(N-iso-propylamino)propyl methacrylate, 3-(N-tert-butylamino)propyl acrylate, 3-(N-tert-butylamino)propyl methacrylate, 3-(N,N-dimethylamino)propyl acrylate, 3-(N,N-dimethylamino)propyl methacrylate, 3-(N,N-diethylamino)propyl acrylate, 3-(N,N-diethylamino)propyl methacrylate, 3-(N,N-di-n-propylamino)propyl acrylate, 3-(N,N-di-n-propylamino)propyl methacrylate, 3-(N,N-di-iso-propylamino)propyl acrylate and 3-(N,N-di-sio-propylamino)propyl methacrylate.

Examples of monomers A containing at least one amido group are acrylamide, methacrylamide, N-methylacrylamide, N-methylmethacrylamide, N-ethylacrylamide, N-ethylmethacrylamide, N-n-propylacrylamide, N-n-propylmethacrylamide, N-iso-propylacrylamide, N-iso-propylmethacrylamide, N-tert-butylacrylamide, N-tert-butylmethacrylamide, N,N-dimethylacrylamide, N,N-dimethylmethacrylamide, N,N-diethylacrylamide, N,N-diethylmethacrylamide, N,N-di-n-propylacrylamide, N,N-di-n-propylmethacrylamide, N,N-di-iso-propylacrylamide, N,N-di-iso-propylmethacrylamide, N,N-di-n-butylacrylamide, N,N-di-n-butylmethacrylamide, N-(3-N',N'-dimethylaminopropyl) methacrylamide, diacetoneacrylamide, N,N'-methylenebisacrylamide, N-(diphenylmethyl)acrylamide, N-cyclohexylacrylamide, and also N-vinylpyrrolidone and N-vinylcaprolactam.

Examples of monomers A containing at least one ureido group are N,N'-divinylethyleneurea and 2-(1-imidazolin-2-onyl)ethyl methacrylate (commercially available, for example, as Norsocryl® 100 from Elf Atochem).

Examples of monomers A containing at least one N-heterocyclic group are 2-vinylpyridine, 4-vinylpyridine, 1-vinylimidazole, 2-vinylimidazole and N-vinylcarbazole.

It is preferred to use the following compounds: 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl) methacrylamide and 2-(1-imidazolin-2-onyl)ethyl methacrylate. Depending on the pH of the aqueous reaction medium, some or all of the above-mentioned nitrogen-containing monomers A may be present in the quaternary ammonium form protonated on the nitrogen.

As monomers A which have a quaternary alkylammonium structure on the nitrogen, mention may be made by way of example of 2-(N,N,N-trimethylammonium)ethyl acrylate chloride (commercially available, for example, as Norsocryl® ADAMQUAT MC 80 from Elf Atochem), 2-(N,N,N-trimethylammonium)ethyl methacrylate chloride (commercially available, for example, as Norsocryl® MADQUAT MC 75 from Elf Atochem), 2-(N-methyl-N,N-diethylammonium)ethyl acrylate chloride, 2-(N-methyl-N, N-diethylammonium)ethyl methacrylate chloride, 2-(N-methyl-N,N-di-n-propylammonium)ethyl acrylate chloride, 2-(N-methyl-N,N-di-n-propylammonium)ethyl methacrylate, 2-(N-benzyl-N,N-dimethylammonium)ethyl acrylate chloride (commercially available, for example, as Norsocryl® ADAMQUAT BZ 80 from Elf Atochem), 2-(N-benzyl-N,N-dimethylammonium)ethyl methacrylate chloride (commercially available, for example, as Norsocryl® MADQUAT BZ 75 from Elf Atochem), 2-(N-benzyl-N,N-diethylammonium)ethyl acrylate chloride, 2-(N-benzyl-N, N-diethylammonium)ethyl methacrylate chloride, 2-(N-benzyl-N,N-di-n-propylammonium)ethyl acrylate chloride, 2-(N-benzyl-N,N-di-n-propylammonium)ethyl methacrylate chloride, 3-(N,N,N-trimethylammonium)propyl acrylate chloride, 3-(N,N,N-trimethylammonium)propyl methacrylate chloride, 3-(N-methyl-N,N-diethylammonium) propyl acrylate chloride, 3-(N-methyl-N,N-diethylammonium)propyl methacrylate chloride, 3-(N-methyl-N,N-di-n-propylammonium)propyl acrylate chloride, 3-(N-methyl-N,N-di-n-propylammonium)propyl methacrylate chloride, 3-(N-benzyl-N,N-dimethylammonium)propyl acrylate chloride, 3-(N-benzyl-N,N-dimethylammonium)propyl methacrylate chloride, 3-(N-benzyl-N,N-diethylammonium)propyl acrylate chloride, 3-(N-benzyl-N,N-diethylammonium)propyl methacrylate chloride, 3-(N-benzyl-N,N-di-n-propylammonium) propyl acrylate chloride and 3-(N-benzyl-N,N-di-n-propylammonium)propyl methacrylate chloride.

Instead of the stated chlorides it is of course also possible to use the corresponding bromides and sulfates.

Preference is given to the use of 2-(N,N,N-trimethylammonium)ethyl acrylate chloride,
2-(N,N,N-trimethylammonium)ethyl methacrylate chloride,
2-(N-benzyl-N,N-dimethylammonium)ethyl acrylate chloride and
2-(N-benzyl-N,N-dimethylammonium)ethyl methacrylate chloride.

In the process of the invention, mixtures of ethylenically unsaturated monomers are used which, based on their total amount, contain >0 and <4% by weight, generally from 0.05 to 3.0% by weight, frequently from from 0.1 to 2.5% by weight and often from 0.2 to 2.0% by weight, of said at least one monomer A.

The weight fraction of said mixture of ethylenically unsaturated monomers, based on the overall amount of said at least one finely divided inorganic solid and said mixture of ethylenically unsaturated monomers, is generally between 10 and 99% by weight, frequently between 25 and 90% by weight and often between 40 and 80% by weight. In accordance with the invention, all of said monomer mixture can be introduced as an initial charge in the reaction medium, together with said at least one finely divided inorganic solid. An alternative option is to include only some, if any, of said monomer mixture in the initial charge, in the aqueous dispersion of solids, and then to add continuously or discontinuously the total amount or, if appropriate, the remaining amount of said monomer mixture during the free-radical emulsion polymerization at the rate at which it is consumed.

Initiators suitable for use as said at least one free-radical polymerization initiator for the free-radical aqueous emulsion polymerization of the invention are all those capable of triggering a free-radical aqueous emulsion polymerization in the presence of said at least one finely divided inorganic solid. The initiators can in principle comprise both peroxides and azo compounds. Redox initiator systems are also suitable, of course. Peroxides used can in principle be inorganic peroxides, such as hydrogen peroxide or peroxodisulfates, such as the mono- or di-alkali metal salts or ammonium salts of peroxodisulfuric acid, such as, for example, its mono- and di-sodium and -potassium salts, or ammonium salts, or else organic peroxides, such as alkyl hydroperoxides, examples being tert-butyl, p-menthyl and cumyl hydroperoxide, and also dialkyl or diaryl peroxides, such as di-tert-butyl peroxide or dicumyl peroxide. Azo compounds used are primarily 2,2'-azobis(isobutyronitrile), 2,2'-azobis(2,4-dimethylvaleronitrile) and 2,2'-azobis(amidinopropyl) dihydrochloride (AIBA, corresponding to v-50 from wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium salts and/or sodium salts, of aliphatic sulfinic acids, and alkali metal hydrogen sulfides, e.g., potassium and/or sodium hydrogen sulfide, salts of polyvalent metals, such as iron(II) sulfate, iron(II)/ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general, the amount of the free-radical polymerization initiator used, based on the total amount of the monomer mixture, is from 0.1 to 3% by weight.

Where the dispersed particles of said at least one inorganic solid have an electrophoretic mobility with a negative sign, said at least one free-radical polymerization initiator used comprises preferably peroxodisulfates, such as the mono- or di-alkali metal or ammonium salts of peroxodisulfuric acid, such as for example the mono- and di-sodium, -potassium or ammonium salts of peroxodisulfuric acid, and also hydrogen peroxide in an alkaline medium.

Where the dispersed particles of said at least one inorganic solid have an electrophoretic mobility with a positive sign, said at least one free-radical polymerization initiator used comprises preferably AIBA.

In accordance with the invention, all of said at least one free-radical polymerization initiator can be introduced, together with said at least one finely divided inorganic solid, as an initial charge in the reaction medium. An alternative option is to include, if appropriate, only some of said at least one free-radical polymerization initiator in the initial charge, in the aqueous dispersion of solids, and then to add, continuously or discontinuously, the total amount, or the remainder if appropriate, during the free-radical emulsion polymerization of the invention at the rate at which it is consumed.

Suitable reaction temperatures for the free-radical aqueous emulsion polymerization of the invention in the presence of said at least one finely divided inorganic solid embrace the entire range from 0 to 170° C. In general, the temperatures used are from 50 to 120° C., frequently from 60 to 110° C. and often $\geq$70 to 100° C. The free-radical aqueous emulsion polymerization of the invention can be conducted at a pressure less than, equal to or greater than 1 bar (absolute), so that the polymerization temperature may exceed 100° C. and can be up to 170° C. Highly volatile monomers such as ethylene, butadiene or vinyl chloride are preferably polymerized under increased pressure. In this case the pressure can adopt values of 1.2, 1.5, 2, 5, 10 or 15 bar or higher. When emulsion polymerizations are conducted under subatmospheric pressure, pressures of 950 mbar, frequently 900 mbar and often 850 mbar (absolute) are established. The free-radical aqueous emulsion polymerization of the invention is advantageously conducted at 1 bar (absolute) under an inert gas atmosphere, such as under nitrogen or argon, for example.

The aqueous reaction medium may in principle also include water-soluble organic solvents, such as methanol, ethanol, isopropanol, butanols, pentanols, but also acetone etc., for example. Preferably, however, the process of the invention is conducted in the absence of such solvents.

It is an essential feature of the invention that the dispersed particles of said at least one inorganic solid under the conditions described above have a nonzero electrophoretic mobility. If the sign of the electrophoretic mobility is positive, the monomers A used comprise ethylenically unsaturated monomers which contain at least one acid group and/or its corresponding anion. If, conversely, the sign of the electrophoretic mobility is negative, the monomers A used comprise ethylenically unsaturated monomers which contain at least one amino, amido, ureido or N-heterocyclic group and/or the ammonium derivatives derivable therefrom.

The process of the invention can be carried out, for example, by introducing a stable aqueous dispersion of said at least one finely divided inorganic solid, containing either some or all of the required water, of the at least one dispersant, of the at least one polymerization initiator and/or of the monomer mixture, and of any further customary auxiliaries and additives, into a reaction vessel, and heating the contents of the reaction vessel to reaction temperature. At this temperature, any remaining amounts of the water, of the at least one dispersant, of the monomer mixture, and of any further customary auxiliaries and additives, are added continuously or discontinuously with stirring, after which the reaction mixture is held further at reaction temperature if desired.

The process of the invention can alternatively be carried out by introducing a stable aqueous dispersion of said at least one finely divided inorganic solid, containing either some or all of the required water, of the at least one dispersant and/or of any further customary auxiliaries and additives and, if desired, only some of said monomer mixture and/or of said at least one polymerization initiator into a reaction vessel and heating the contents of the reaction vessel to reaction temperature. At this temperature, all or, if appropriate, the remainder of said monomer mixture and/or of said at least one polymerization initiator, and any remaining amounts of the water, of the at least one dispersant and/or of any further customary auxiliaries and additives, is added continuously or discontinuously, with stirring, after which the reaction mixture is held further at reaction temperature if desired.

The composite particles obtainable in accordance with the invention generally possess particle diameters of $\leq 5,000$ nm, frequently $\leq 1,000$ nm and often $\leq 400$ nm. The particle diameters are determined conventionally by transmission electron microscopy analyses (cf., e.g., L. Reimer, Transmission Electron microscopy, Apringer-Verlag, Berlin, Heidelberg, 1989; D. C. Joy, The Basic Principles of EELS in Principles of Analytical Electron Microscopy, edited by D. C. Joy, A. D. Romig Jr. and J. I. Goldstein, Plenum Press, New York, 1986; L. C. Sawyer and D. T. Grupp, Polymer microscopy, Chapman and Hall, London, 1987).

The composite particles obtainable by the process of the invention can have different structures. Composite particles having a raspberry-shaped structure are frequently obtained. The composite particles of the invention can comprise one or more of the finely divided solid particles. The finely divided solid particles may be completely enveloped by the polymer matrix. Alternatively, it is possible for some of the finely divided solid particles to be enveloped by the polymer matrix while others are arranged on the surface of the polymer matrix. It is of course also possible for a majority of the finely divided solid particles to be bound on the surface of the polymer matrix. Preferably $\geq 50\%$ or $\geq 60\%$, frequently $\geq 70\%$ or $\geq 80\%$, and often $\geq 85\%$ or $\geq 90\%$ by weight of the finely divided solid particles, based in each case on the overall amount of finely divided solid particles present in the composite particles, are bound on the surface of the polymer matrix. It should be noted that in certain cases, depending on the solids concentration of the dispersed composite particles, there may also be slight partial agglomeration of the composite particles.

The monomer residues remaining in the aqueous dispersion of the composite particles after the end of the main polymerization reaction can of course be removed by steam stripping and/or inert gas stripping and/or by chemical deodorization, as described, for example, in the documents DE-A 4 419 518, EP-A 767 180 and DE-A 3 834 734, without adversely affecting the properties of the aqueous dispersion of composite particles.

Aqueous dispersions of composite particles prepared by the process of the invention described are suitable as raw materials for preparing adhesives, such as pressure-sensitive adhesives, building adhesives or industrial adhesives, for example, binders, such as for paper coating, for example, emulsion paints, or for printing inks and print varnishes for printing plastics films, for producing nonwovens, and for producing protective coats and water vapor barriers, such as in priming, for example. In addition, the dispersions of composite particles obtainable by the process of the invention can be used to modify cement formulations and mortar formulations. The composite particles obtainable by the process of the invention can also be used, in principle, in medical diagnostics and in other medical applications (cf., e.g., K. Mosbach and L. Andersson, Nature 270 (1977) 259 to 261; P. L. Kronick, Science 200 (1978) 1074 to 1076; and U.S. Pat. No. 4,157,323). Furthermore, the composite particles can also be used as catalysts in various aqueous dispersion systems.

It should also be noted that the aqueous dispersions of composite particles, obtainable in accordance with the invention, can be dried in a simple manner to give redispersible composite-particle powders (e.g., by freeze or spray drying). This is so in particular when the glass transition temperature of the polymer matrix of the composite particles obtainable in accordance with the invention is $\geq 50°$ C., preferably $\geq 60°$ C., with particular preference $\geq 70°$ C., with very particular preference $\geq 80°$ C., and, with special preference, $\geq 90°$ C. or $\geq 100°$ C. The composite-particle powders are suitable, inter alia, as plastics additives, components for toner formulations, and additives in electrophotographic applications.

EXAMPLES

Finely divided inorganic solids used for the examples below were silicon dioxide, yttrium(III) oxide and cerium (IV) oxide. Used as representative examples were the commercially available silicon dioxide sols Nyacol® 2040 (20 nm) and Nyacol® 830 (10 nm) from Akzo-Nobel and also Ludox® HS30 (12 nm) from DuPont. Also used were Nyacol® YTTRIA [yttrium(III) oxide] (10 nm) and Nyacol® CEO2 {ACT} [cerium(IV) oxide] (10 to 20 nm). The values indicated in round brackets correspond to the diameters of the respective inorganic solid particles according to the manufacturers' indications.

The dispersions of solids used in the examples met all of the requirements made of them, namely that at an initial solids concentration of $\geq 1\%$ by weight, based on the aqueous dispersion of the solid, they still, one hour after their preparation, contained more than 90% by weight of the originally dispersed solid in dispersed form and their dispersed solid particles had a weight-average diameter $\leq 100$ nm, and, furthermore, the dispersed inorganic solid particles showed a nonzero electrophoretic mobility in an aqueous standard potassium chloride solution at a pH corresponding to the pH of the aqueous reaction medium at the beginning of the emulsion polymerization.

1st Example

A 500 ml four-necked flask equipped with a reflux condenser, a thermometer, a mechanical stirrer and a metering device was charged under nitrogen atmosphere at 20° C. and 1 bar (absolute) with 80 g of deionized and oxygen-free water and with 0.04 g of 1 M sodium hydroxide solution and, with stirring (250 revolutions per minute), 20 g of Nyacol® 2040 were added. The reaction mixture was then heated to a reaction temperature of 75° C. The pH of this aqueous phase, measured at room temperature, was 10.

In parallel, an aqueous emulsion consisting of 10 g of styrene, 10 g of n-butyl acrylate, 0.19 g of 1 M sodium hydroxide solution, 80 g of deionized and oxygen-free water, 1 g of a 20% strength by weight aqueous solution of the nonionic emulsifier Lutensol® AT18 (trademark of BASF AG, $C_{16}C_{18}$ fatty alcohol ethoxylate having 18 ethylene oxide units) and 0.25 g of Norsocryl® ADAMQUAT MC 80 (80% strength by weight aqueous solution of 2-(N, N,N-trimethylammonium)ethyl acrylate chloride) was prepared (feed stream 1). An initiator solution was prepared from 0.23 g ammonium peroxodisulfate and 45 g of deionized and oxygen-free water (feed stream 2).

At reaction temperature, 5 g of feed stream 2 were added to the stirred reaction medium. After 5 minutes, and beginning synchronously, feed stream 1 was metered into the stirred reaction medium at reaction temperature over the course of 2 hours, and the remainder of feed stream 2 over the course of 2.5 hours. The reaction mixture was subsequently stirred at reaction temperature for 1 hour and then cooled to room temperature.

The resulting aqueous composite-particle dispersion had a solids content of 11.4% by weight, based on the overall weight of the aqueous composite-particle dispersion.

Transmission electron microscopy analyses of the aqueous composite-particle dispersion diluted with deionized water to a solids content of approximately 0.01% by weight, using a Zeiss 902 instrument from Zeiss, showed raspberry-shaped composite particles having a diameter of approximately 250 nm. It was virtually impossible to detect any free silicon dioxide particles.

Centrifugation of the composite-particle dispersion (3000 revolutions per minute, duration 20 minutes) gave complete sedimentation of the dispersed particles. No silicon dioxide particles were detectable in the supernatant, water-clear solution by means of transmission electron microscopy analyses.

For the finely divided inorganic solids, in general, the sign of the electrophoretic mobility was determined by means of the Zetasizer 3000 from Malvern Instruments Ltd., Great Britain. For this purpose, the dispersion of finely divided inorganic solid was diluted with aqueous pH-neutral 10 mM potassium chloride solution (standard potassium chloride solution) until its concentration of solid particles was between 50 and 100 mg per liter. Dilute hydrochloric acid or dilute sodium hydroxide solution was used to establish the pH possessed by the aqueous reaction medium directly prior to the addition of the polymerization initiator.

1 M sodium hydroxide solution was used to establish a pH of 10 in the Nyacol® 2040 dispersion diluted to a silicon dioxide solids content of 60 mg/l. The sign of the electrophoretic mobility of the silicon dioxide particles in Nyacol® 2040 was negative here.

The solids content was determined in general by drying about 1 g of the composite-particle dispersion in an open aluminum crucible having an internal diameter of about 3 cm in a drying oven at 150° C. for 2 hours. To determine the solids content, two separate measurements were carried out in each case and the corresponding mean value was formed.

1st Comparative Example

Example 1 was repeated but using 0.25 g of deionized and oxygen-free water instead of 0.25 g of Norsocryl® ADAMQUAT MC 80.

The resulting particle dispersion had a solids content of 11.1% by weight, based on the overall weight of the aqueous particle dispersion. The cloudy reaction mixture obtained was investigated by means of transmission electron microscopy measurements. Raspberry-shaped composite particles were not detectable.

Centrifugation of the cloudy dispersion (3000 revolutions per minute, duration 20 minutes) gave no sedimentation of the dispersed particles.

2nd Comparative Example

Example 1 was repeated but using 0.2 g of the sodium salt of 4-styrenesulfonic acid instead of 0.25 g of Norsocryl® ADAMQUAT MC 80.

The resulting particle dispersion had a solids content of 11.4% by weight, based on the overall weight of the aqueous particle dispersion. The cloudy reaction mixture obtained was investigated by means of transmission electron microscopy measurements. Raspberry-shaped composite particles were not detectable.

Centrifugation of the cloudy dispersion (3000 revolutions per minute, duration 20 minutes) gave no sedimentation of the dispersed particles.

2nd Example

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 2.5 using 1.62 g of 1 M hydrochloric acid and was made up to 100 g with water whose pH had been adjusted to 2.5 using 1 M hydrochloric acid. The reaction mixture was then heated to a reaction temperature of 75° C. The pH of this aqueous phase, measured at room temperature, was 2.5.

In parallel, an aqueous emulsion consisting of 10 g of styrene, 10 g of n-butyl acrylate, 80 g of deionized and oxygen-free water, 0.44 g of a 45% strength by weight aqueous solution of Dowfax® 2A1, and 0.2 g of 4-vinylpyridine was prepared (feed stream 1). An initiator solution was prepared from 0.23 g of ammonium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.5% by weight, based on the overall weight of the aqueous composite-particle dispersion. The presence of raspberry-shaped composite particles having a diameter of approximately 200 to 300 nm was demonstrated by means of transmission electron microscopy analyses. It was virtually impossible to detect any free silicon dioxide particles.

The silicon dioxide particles of Nyacol® 2040 had an electrophoretic mobility with a negative sign at a pH of 2.5.

Centrifugation of the composite-particle dispersion (3000 revolutions per minute, duration 20 minutes) gave complete sedimentation of the dispersed particles. Virtually no silicon dioxide particles were detectable in the supernatant, water-clear solution by means of transmission electron microscopy analyses.

3rd Comparative Example

Example 2 was repeated but using 0.2 g of deionized and oxygen-free water instead of 0.2 g of 4-vinylpyridine.

The resulting particle dispersion had a solids content of 11.6% by weight, based on the overall weight of the aqueous particle dispersion. The cloudy reaction mixture obtained was investigated by means of transmission electron microscopy measurements.

Raspberry-shaped composite particles were not detectable.

Centrifugation of the cloudy dispersion (3000 revolutions per minute, duration 20 minutes) gave no sedimentation of the dispersed particles.

4th Comparative Example

Example 2 was repeated but using 0.2 g of the sodium salt of 4-styrenesulfonic acid instead of 0.2 g of 4-vinylpyridine.

The resulting particle dispersion had a solids content of 11.5% by weight, based on the overall weight of the aqueous particle dispersion. The cloudy reaction mixture obtained was investigated by means of transmission electron microscopy measurements. Raspberry-shaped composite particles were not detectable.

Centrifugation of the cloudy dispersion (3000 revolutions per minute, duration 20 minutes) gave no sedimentation of the dispersed particles.

3rd Example

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 2.5 using 1.62 g of 1 M hydrochloric acid and was made up to 100 g with water whose pH had been adjusted to 2.5 using 1 M hydrochloric acid. The reaction mixture was then heated to a reaction temperature of 75° C. The pH of this aqueous phase, measured at room temperature, was 2.5.

In parallel, an aqueous emulsion consisting of 10 g of styrene, 10 g of n-butyl acrylate, 80 g of deionized and oxygen-free water, 1 g of 20% strength by weight aqueous solution of the nonionic emulsifier Lutensol® AT18 and 0.05 g of 4-vinylpyridine was prepared (feed stream 1). An initiator solution was prepared from 0.23 g of ammonium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.1% by weight, based on the overall weight of the aqueous composite-particle dispersion. The presence of raspberry-shaped composite particles having a diameter of approximately 220 nm was demonstrated by means of transmission electron microscopy analyses. Free silicon dioxide particles were detected only in trace amounts.

4th Example

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 7 using 0.5 g of 1 M hydrochloric acid and was made up to 100 g with deionized and oxygen-free water. The reaction mixture was then heated to a reaction temperature of 85° C. The pH of this aqueous phase, measured at room temperature, was 7.

In parallel, an aqueous emulsion consisting of 20 g of styrene, 80 g of deionized and oxygen-free water, 1 g of 20% strength by weight aqueous solution of the nonionic emulsifier Lutensol® AT18 and 0.2 g of 4-vinylpyridine was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.6% by weight, based on the overall weight of the aqueous composite-particle dispersion. The presence of raspberry-shaped composite particles having a diameter of from about 140 to 220 nm was demonstrated by means of transmission electron microscopy analyses. Free silicon dioxide particles were detected only in trace amounts.

The silicon dioxide particles of Nyacol® 2040 had an electrophoretic mobility with a negative sign at a pH of 7.

5th Example

Example 4 was repeated but adjusting the aqueous reaction medium to a pH of 5.

For the preparation of the initial charge, under a nitrogen atmosphere, 60 g of deionized and oxygen-free water and 1.5 g of 1 M hydrochloric acid were charged at 20° C. and 1 bar (absolute) to the vessel and 20 g of Nyacol® 2040 were added with stirring (250 revolutions per minute). The aqueous phase was subsequently adjusted to a pH of 5 using 1.0 g of 1 M hydrochloric acid and was made up to 100 g with water which had been adjusted to a pH of 5 using 1 M hydrochloric acid. The reaction mixture was then heated to a reaction temperature of 85° C. The pH of this aqueous phase, measured at room temperature, was 5.

The resulting composite-particle dispersion had a solids content of 11.6% by weight, based on the overall weight of the aqueous composite-particle dispersion. The presence of raspberry-shaped composite particles having a diameter of from about 170 nm was demonstrated by means of transmission electron microscopy analyses. Free silicon dioxide particles were detected only in trace amounts.

The silicon dioxide particles of Nyacol® 2040 had an electrophoretic mobility with a negative sign at a pH of 5.

6th Example

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 2.5 using 1.62 g of 1 M hydrochloric acid and was made up to 100 g with deionized and oxygen-free water which had been adjusted to a pH of 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 20 g of styrene, 80 g of deionized and oxygen-free water, 2 g of a 20% strength by weight aqueous solution of the nonionic emulsifier Lutensol® AT18 and 0.2 g of 2-vinylpyridine was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 10.5% by weight, based on the overall weight of the aqueous composite-particle dispersion. The presence of raspberry-shaped composite particles having a diameter of from about 140 to 180 nm was demonstrated by means of transmission electron microscopy analyses. Free silicon dioxide particles were detected only in trace amounts.

7th Example

Example 6 was repeated but using 0.2 g of Norsocryl® MADAME [2-(N,N-(dimethylamino)ethyl methacrylate)] instead of 0.2 g of 2-vinylpyridine in order to prepare feed stream 1. The resulting composite-particle dispersion had a solids content of 11.8% by weight, based on the overall weight of the aqueous composite-particle dispersion. The presence of raspberry-shaped composite particles having a diameter of about 170 nm was demonstrated by means of transmission electron microscopy analyses. Virtually no free silicon dioxide particles were detected.

8th Example

Under a nitrogen atmosphere, 60 g of deionized and oxygen-free water and 1.5 g of 1 M hydrochloric acid were charged at 20° C. and 1 bar (absolute) to a 500 ml four-necked flask and 20 g of Nyacol® 2040 were added with stirring (250 revolutions per minute). The aqueous phase was subsequently adjusted to a pH of 2.5 using 1.62 g of 1 M hydrochloric acid and was made up to 100 g with deionized and oxygen-free water which had been adjusted to a pH of 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 10 g of styrene, 10 g of 2-ethylhexyl acrylate, 80 g of deionized and oxygen-free water, 1 g of a 20% strength by weight aqueous solution of the nonionic emulsifier Lutensol® AT18 and 0.05 g of 4-vinylpyridine 10 was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.5% by weight, based on the overall weight of the aqueous composite-particle dispersion. The presence of raspberry-shaped composite particles having a diameter of from about 300 nm was demonstrated by means of transmission electron microscopy analyses. Free silicon dioxide particles were detected only in trace amounts:

9th Example

Example 8 was repeated but using 10 g of methyl methacrylate instead of 10 g of styrene in order to prepare feed stream 1.

The resulting composite-particle dispersion had a solids content of 11.1% by weight, based on the overall weight of the aqueous composite-particle dispersion. The presence of raspberry-shaped composite particles having a diameter of approximately 220 nm was detected by means of transmission electron microscopy analyses. It was virtually impossible to detect any free silicon dioxide particles.

10th Example

Example 9 was repeated but using 10 g of n-butyl acrylate instead of 10 g of 2-ethylhexyl acrylate in order to prepare feed stream 1.

The resulting composite-particle dispersion had a solids content of 11.4% by weight, based on the overall weight of the aqueous composite-particle dispersion. The presence of raspberry-shaped composite particles having a diameter of approximately 220 nm was detected by means of transmission electron microscopy analyses. It was virtually impossible to detect any free silicon dioxide particles.

11th Example

Under a nitrogen atmosphere, 40 g of deionized and oxygen-free water and 1.5 g of 1 M hydrochloric acid were charged at 20° C. and 1 bar (absolute) to a 500 ml four-necked flask and 40 g of Nyacol® 2040 were added with stirring (250 revolutions per minute). The aqueous phase was subsequently adjusted to a pH of 2.5 using 3.99 g of 1 M hydrochloric acid and was made up to 100 g with deionized and oxygen-free water whose pH had been adjusted to 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 20 g of styrene, 20 g of n-butyl acrylate, 60 g of deionized and oxygen-free water, 2 g of a 20% strength by weight aqueous solution of the nonionic emulsifier Lutensol® AT18, and 0.1 g of 4-vinylpyridine was prepared (feed stream 1). An initiator solution was prepared from 0.9 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 22.9% by weight, based on the overall weight of the aqueous composite-particle dispersion. The presence of raspberry-shaped composite particles having a diameter of approximately 120 to 300 nm was demonstrated by means of transmission electron microscopy analyses. It was virtually impossible to detect any free silicon dioxide particles.

12th Example

Under a nitrogen atmosphere, 15 g of deionized and oxygen-free water and 1.5 g of 1 M hydrochloric acid were charged at 20° C. and 1 bar (absolute) to a 500 ml four-necked flask and 73.5 g of Nyacol® 2040 were added with stirring (250 revolutions per minute). The aqueous phase was subsequently adjusted to a pH of 2.5 using 8.24 g of 1 M hydrochloric acid and was made up to 100 g with deionized and oxygen-free water whose pH had been adjusted to 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 34.3 g of styrene, 34.3 g of n-butyl acrylate, 31.4 g of deionized and oxygen-free water, 3.43 g of a 20% strength by weight aqueous solution of the nonionic emulsifier Lutensol® AT18, and 0.1 g of 4-vinylpyridine was prepared (feed stream 1). An initiator solution was prepared from 1.54 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 37.5% by weight, based on the overall weight of the aqueous composite-particle dispersion. The presence of raspberry-shaped composite particles having a diameter of approximately 120 to 240 nm was demonstrated by means of transmission electron microscopy analyses. It was virtually impossible to detect any free silicon dioxide particles.

13th Example

Under a nitrogen atmosphere, 50 g of deionized and oxygen-free water and 1.5 g of 1 M hydrochloric acid were charged at 20° C. and 1 bar (absolute) to a 500 ml four-necked flask and 26.7 g of Nyacol® 830 (having a silicon dioxide solids content of 30% by weight) were added with stirring (250 revolutions per minute). The aqueous phase was subsequently adjusted to a pH of 2.5 using 4.06 g of 1 M hydrochloric acid and was made up to 100 g with deionized and oxygen-free water whose pH had been adjusted to 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 20 g of styrene, 80 g of deionized and oxygen-free water, 2 g of a 20% strength by weight aqueous solution of the nonionic emulsifier Lutensol® AT18, and 0.2 g of Norsocryl® MADAME was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 12.0% by weight, based on the overall weight of the aqueous composite-particle dispersion. The presence of raspberry-shaped composite particles having a diameter of approximately 160 to 200 nm was demonstrated by means of transmission electron microscopy analyses. It was virtually impossible to detect any free silicon dioxide particles.

At a pH of 2.5, the silicon dioxide particles of Nyacol® 830 had an electrophoretic mobility with a negative sign.

14th Example

Under a nitrogen atmosphere, 50 g of deionized and oxygen-free water and 1.5 g of 1 M hydrochloric acid were charged at 20° C. and 1 bar (absolute) to a 500 ml four-necked flask and 26.7 g of Ludox® HS30 (having a silicon dioxide solids content of 30% by weight) were added with stirring (250 revolutions per minute). The aqueous phase was subsequently adjusted to a pH of 2.5 using 1.88 g of 1 M hydrochloric acid and was made up to 100 g with deionized and oxygen-free water whose pH had been adjusted to 2.5 using 1 M hydrochloric acid. The reaction mixture was then heated to a reaction temperature of 85° C. The pH of this aqueous phase, measured at room temperature, was 2.5.

In parallel, an aqueous emulsion consisting of 10 g of styrene, 10 g of n-butyl acrylate, 80 g of deionized and oxygen-free water, 1 g of a 20% strength by weight aqueous solution of the nonionic emulsifier Lutensol® AT1B, and 0.05 g of 4-vinylpyridine was prepared (feed stream 1). An initiator solution was prepared from 0.45 g of sodium peroxodisulfate and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 9.7% by weight, based on the overall weight of the aqueous composite-particle dispersion. The presence of raspberry-shaped composite particles having a diameter of approximately 200 nm was demonstrated by means of transmission electron microscopy analyses. It was virtually impossible to detect any free silicon dioxide particles.

At a pH of 2.5, the silicon dioxide particles of Ludox® HS30 had an electrophoretic mobility with a negative sign.

15th Example

Under a nitrogen atmosphere, 60 g of deionized and oxygen-free water and 0.01 g of 1 M hydrochloric acid were charged at 20° C. and 1 bar (absolute) to a 500 ml four-necked flask and 40 g of Nyacol® CEO2 {ACT} (having a cerium(IV) oxide solids content of 20% by weight) were added with stirring (250 revolutions per minute). The reaction mixture was then heated to a reaction temperature of 85° C. The pH of this aqueous phase, measured at room temperature, was 3.

In parallel, an aqueous emulsion consisting of 20 g of styrene, 80 g of deionized and oxygen-free water, 1 g of a 20% strength by weight aqueous solution of the nonionic emulsifer Lutensol® AT18, and 0.2 g of the sodium salt of 4-styrenesulfonic acid was prepared (feed stream 1). An initiator solution was prepared from 0.45 g of AIBA and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 11.2% by weight, based on the overall weight of the aqueous composite-particle dispersion. The presence of raspberry-shaped composite particles having a diameter of approximately 200 to 400 nm was demonstrated by means of transmission electron microscopy measurements. It was virtually impossible to detect any free cerium(IV) oxide particles.

At a pH of 3, the cerium(IV) oxide particles of Nyacol® CEO2 {ACT} had an electrophoretic mobility with a positive sign.

Centrifuging the composite-particle dispersion (3000 revolutions per minute, duration 20 minutes) gave complete sedimentation of the dispersed particles.

5th Comparative Example

Example 15 was repeated but using 0.25 g of Norsocryl® ADAMQUAT MC 80 instead of 0.2 g of the sodium salt of 4-styrenesulfonic acid in the preparation of feed stream 1.

The particle dispersion formed had a solids content of 11.4% by weight, based on the overall weight of the aqueous particle dispersion. The cloudy reaction mixture obtained was analyzed by means of transmission electron microscopy measurements. Raspberry-shaped composite particles were not detectable.

Centrifuging the cloudy dispersion (3000 revolutions per minute, duration 20 minutes) gave no sedimentation of the dispersed particles.

16th Example

Under a nitrogen atmosphere, 42.9 g of deionized and oxygen-free water were charged at 20° C. and 1 bar (absolute) to a 500 ml four-necked flask and 57.1 g of Nyacol® YTTRIA (having a yttrium(III) oxide solids content of 14% by weight) were added with stirring (250 revolutions per minute). The reaction mixture was then heated to a reaction temperature of 85° C. The pH of this aqueous phase, measured at room temperature, was 7.2.

In parallel, an aqueous emulsion consisting of 20 g of styrene, 80 g of deionized and oxygen-free water, 1 g of a 20% strength by weight aqueous solution of the nonionic emulsifier Lutensol® AT18, and 0.2 g of methacrylic acid was prepared (feed stream 1). An initiator solution was prepared from 0.45 g of AIBA and 45 g of deionized and oxygen-free water (feed stream 2).

At reaction temperature, 5 g of feed stream 2 were added to the stirred reaction medium. After allowing 5 minutes to elapse, and beginning simultaneously, feed stream 1 was metered at reaction temperature into the stirred reaction medium over the course of 2 hours, and the remainder of feed stream 2 over the course of 2.5 hours. The reaction mixture was subsequently stirred at reaction temperature for 1 hour and then cooled to room temperature.

The resulting composite-particle dispersion had a solids content of 13.7% by weight, based on the overall weight of the aqueous composite-particle dispersion. The presence of raspberry-shaped composite particles a diameter of approximately 90 nm was demonstrated by means of transmission electron microscopy measurements. It was virtually impossible to detect any free yttrium(III) oxide particles.

At a pH of 7.2, the yttrium(III) oxide particles of Nyacol® YTTRIA had an electrophoretic mobility with a positive sign.

We claim:

1. A process for preparing an aqueous dispersion of composite particles composed of addition polymer and finely divided inorganic solid, comprising:

polymerizing a mixture of ethylenically unsaturated monomers dispersely distributed in an aqueous medium by free-radical aqueous emulsion polymerization by means of at least one free-radical polymerization initiator in the presence of at least one dispersely distributed, finely divided inorganic solid, which is characterized by (a) and (b) which follow, and at least one dispersant, wherein a) the aqueous dispersion of said at least one inorganic solid is stable in that it has an initial solids concentration of $\geq 1\%$ by weight, based on the aqueous dispersion of said at least one solid, and still contains in dispersed form one hour after its preparation more than 90% by weight of the originally dispersed solid and its dispersed solid particles have a weight-average diameter $\leq 100$ nm, b) the dispersed particles of said at least one inorganic solid exhibit a non-zero electrophoretic mobility in an aqueous standard potassium chloride solution at a pH which corresponds to the pH of the aqueous reaction medium at the beginning of the emulsion polymerization, and c) the mixture of ethylenically unsaturated monomers of the polymerization medium contains >0 and $\leq 4\%$ by weight, based on its overall amount, of at least one ethylenically unsaturated monomer A, that is at least one acid group and/or its corresponding anion containing monomer, if the dispersed particles of said at least one inorganic solid have an electrophoretic mobility with a positive sign under the abovementioned conditions, or at least one amino, amido, ureido or N-heterocyclic group and/or its ammonium derivatives alkylated or protonated on the nitrogen containing monomer, if the dispersed particles of said at least one inorganic solid have an electrophoretic mobility with a negative sign under the above-mentioned conditions.

2. A process as claimed in claim 1, wherein said at least one inorganic solid is selected from the group consisting of silicon dioxide, aluminum oxide, tin(IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, iron(II) oxide, iron(III) oxide, iron(II/III) oxide, titanium dioxide, hydroxyapatite, zinc oxide, and zinc sulfide.

3. A process as claimed in claim 1, wherein said at least one inorganic solid in water at 20° C. and 1 bar (absolute) has a solubility ≦1 g/l water.

4. A process as claimed in claim 1, wherein said at least one dispersant is an emulsifier.

5. A process as claimed in claim 1, wherein said at least one monomer A comprises at least one acid group and/or its corresponding anion which is selected from the group consisting of the carboxylic acid, sulfonic acid, sulfuric acid, phosphoric acid and phosphonic acid groups.

6. A process as claimed in claim 1, wherein said at least one monomer A is selected from the group consisting of acrylic acid, methacrylic acid, maleic acid, fumaric acid, itaconic acid, crotonic acid, 4-styrenesulfonic acid, 2-methacryloxyethylsulfonic acid, vinylsulfonic acid and vinylphosphonic acid.

7. A process as claimed in claim 1, wherein said at least one monomer A is selected from the group consisting of 2-vinylpyridine, 4-vinylpyridine, 2-vinylimidazole, 2-N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl) methacrylde and 2-(1-imidazolin-2-onyl)ethyl methacrylate and also 2-(N,N,N-trimethylammonium)ethyl acrylate chloride, 2-(N,N,N-trimethylammonium)ethyl methacrylate chloride, 2-(N-benzyl-N,N-dimethylammonium)ethyl acrylate chloride and 2-(N-benzyl-N,N-dimethylammonium) ethyl methacrylate chloride.

8. A process as claimed in claim 1, wherein said at least one free-radical polymerization initiator is 2,2'-azobis (amidinopropyl) dihydrochloride.

9. A process as claimed in claim 7, wherein said at least one free-radical polymerization initiator is selected from the group consisting of sodium peroxodisulfate, potassium peroxodisulfate and ammonium peroxodisulfate.

10. An aqueous dispersion of composite particles prepared by a process as claimed in claim 1.

11. An aqueous dispersion as claimed in claim 10, wherein ≧50% by weight of the finely divided solid particles, based on the overall amount of finely divided solid particles present in the composite particles, are bound on the surface of the polymer matrix.

12. A composite-particle powder prepared by drying the aqueous dispersion of composite particles as claimed in claim 1.

13. A method of preparing an adhesive, comprising:
formulating the adhesive with the aqueous dispersion as claimed in claim 1 as an ingredient.

14. A method of preparing a binder, comprising:
formulating the binder with the aqueous dispersion as claimed in claim 1 as an ingredient.

15. A method of producing a protective coat, comprising:
coating a surface with a formulation containing the aqueous dispersion as claimed in claim 1 as an ingredient.

16. A method of producing modified cement and mortar formulations, comprising:
incorporating the aqueous dispersion as claimed in claim 1 as an ingredient in a cement or mortar formulation.

17. A method of conducting medical diagnosis, comprising:
incorporating the aqueous dispersion as claimed in claim 1 in a diagnostic procedure.

18. A process as claimed in claim 1, wherein the amount of dispersant in the polymerization medium ranges from 0.05 to 20% by wt, based on the combined weight of the finely divided inorganic solid and the mixture of ethylenically unsaturated monomers.

19. A process as claimed in claim 1, wherein the particles of the initial solids concentration have a weight average diameter of ≦100 mm.

20. A process as claimed in claim 1, wherein the initial solids concentration is ≦60% by weight.

21. A process as claimed in claim 1, wherein the amount of monomer A ranges from 0.05 to 3.0% by weight.

* * * * *